April 2, 1963 M. M. A. A. VERSTRAELEN ET AL 3,084,291

CIRCUIT-ARRANGEMENT FOR PUSH-PULL FREQUENCY DEMODULATION OR PHASE COMPARISON

Filed May 7, 1958

INVENTORS
MARIE M.A.A.G.VERSTRAELEN
HENDRIK VOLKERS
GERARDUS ROSIER

BY Frank R. Trifari

AGENT 3,084,291

CIRCUIT-ARRANGEMENT FOR PUSH-PULL FREQUENCY DEMODULATION OR PHASE COMPARISON

Marie Marcel Antoine Arnold Ghislain Verstraelen, Hendrik Volkers, and Gerardus Rosier, all of Hilversum, Netherlands, assignors to North American Philips Company, Inc., New York, N.Y., a corporation of Delaware Filed May 7, 1958, Ser. No. 733,587
Claims priority, application Germany May 7, 1957
8 Claims. (Cl. 329—138)

This invention relates to circuit arrangements for push-pull frequency demodulation or phase comparison, comprising a discriminator network to which the signal oscillations to be demodulated or compared are supplied from a source and demodulated in push-pull by two rectifiers coupled to this network.

A known frequency demodulator equipped with tubes possesses two resonance circuits tuned to the same frequency, so that the oscillations produced at these circuits are 90° shifted in phase at their central frequency and the rectified signals produced by bipolar rectifiers are equal and opposite to each other, the demodulated signal then being exactly zero. If it is desired to use transistors in this known circuit, it is necessary to tap the circuits to low impedance values, which may involve difficulties in regard to the proportioning and the sensitivity.

The invention provides a suitable solution of this problem and is characterized in that the rectifiers are constituted by the emitter-base paths of two transistors, that the discriminator network supplies a first signal current which traverses the emitter-base paths with the same phase, and also a second signal current, which traverses the emitter-base paths in phase opposition and exhibits a relative phase shift, more particularly a phase-shift dependent upon the frequency of the signal oscillations and having a mean value of 90°, with respect to the first signal current, the second signal current being obtained in a closed series resonant circuit which includes the emitter-base paths in series, and that the output signal, more particularly the demodulated signal, results from the difference of the rectified signals produced by the transistors.

Figure 1:
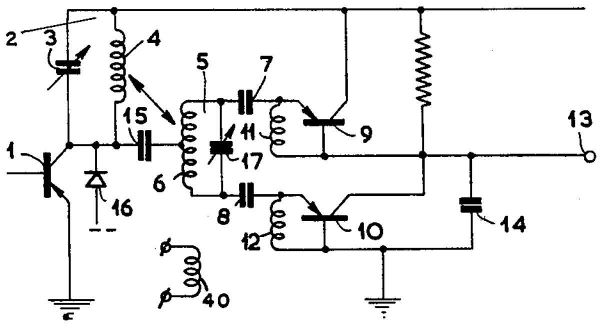
Figure 2:
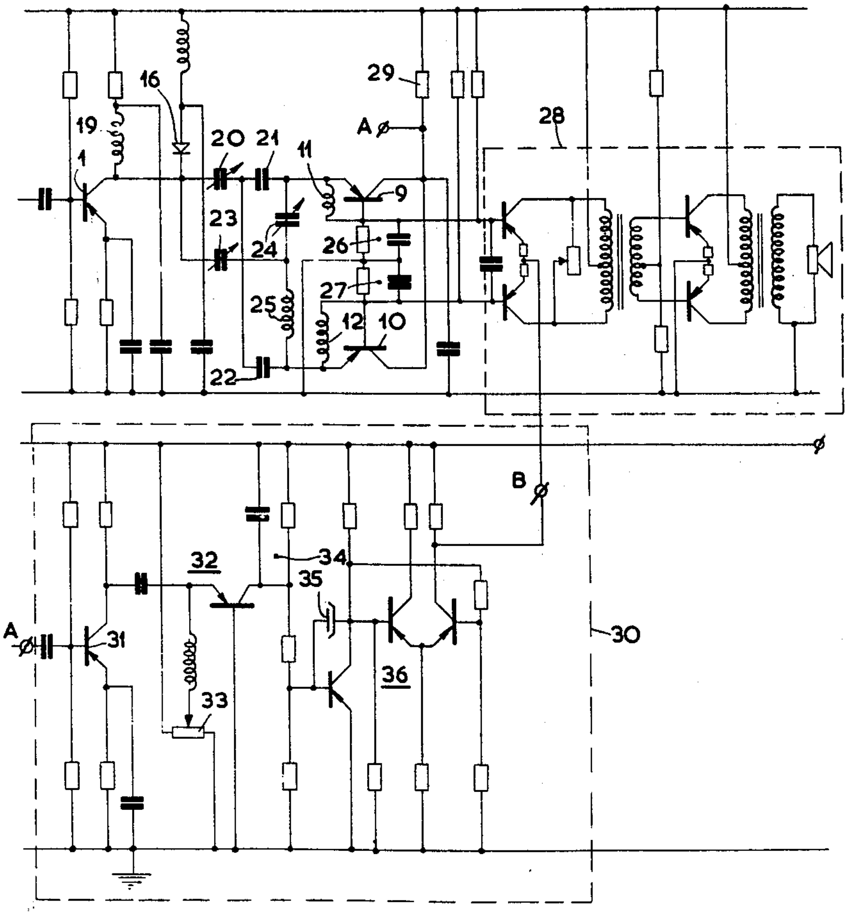

In order that the invention may be more readily carried into effect, it will now be described in detail, by way of example, with reference to the accompanying drawing, in which:

FIG. 1 is a schematic diagram illustrating one form of a detector in accordance with the invention; and FIG. 2 is a schematic diagram illustrating another form of detector system in accordance with the invention.

The circuit shown in FIG. 1 comprises a first transistor 1, which is included, for example, in the last intermediate frequency amplifying stage of an ultrashort-wave (frequency modulation) receiver. The output circuit of transistor 1 includes a resonance circuit 2 comprising a capacitor 3 and an inductance coil 4. The circuit 2 is tuned to the central frequency of the oscillations to be demodulated and coupled by inductive means to a resonance circuit 5.

The circuit 5 is constituted by a centre-tapped coil 6 and capacitors 7 and 8 and closes via transistors 9 and 10 connected as peak-current rectifiers. The emitters and bases of the transistors 9 and 10 are connected together via intermediate frequency choke coils 11 and 12, the demodulated current flowing through the transistors 9 and 10 and the choke coils 11 and 12 in phase opposition to an output terminal 13, which is connected to earth by means of a capacitor 14 for the frequency of the oscillations to be demodulated.

The capacitors 7 and 8 are preferably of same value and their series-combination with the whole coil 6 is tuned to the central frequency of the oscillations to be demodulated. Consequently a second signal current produced in circuit 5 is shifted in phase by 90° for the central frequency with respect to the first signal current supplied via a capacitor 15 to the centre tapping of coil 6. The transistors 9 and 10 are traversed by the second signal current in phase-opposition and by the first signal current with the same phase. Thus, a sufficient sensitivity of the circuit with good matching is obtained.

The transistor 1 is preferably connected, by means of a sufficiently large control, as a collector limiter for the voltage across the circuit 3, 4. In this case, the sensitivity of the detector with respect to an amplitude modulation of the input signal may be substantially suppressed by means of capacitor 15. The limiting action may, if necessary, be further improved by the use of a rectifier 16, by which the collector of transistor 1 is connected to a suitable threshold voltage (for example double the supply voltage).

One practical embodiment of this principle is shown in FIG. 2, in which a choke coil is connected in series with rectifier 16 to avoid current pulses upon the source of supply.

However, in most cases, the rectifier 16 is not required and even the capacitors 15 and 3 can be omitted. In fact, the capacitors 7 and 8 are active across the coil 6 in parallel to the coil 4 and by suitable proportioning of the coils 4 and 6, the resonance of circuit 2 as required for proper limiter action is already obtained without the capacitor 3. However, in most cases, a small trimmer capacitor is used for 3 to permit a subsequent adjustment. For the same reason a trimmer capacitor 17 is arranged in parallel to the coil 6. However, the capacity which is active in parallel to the coil 4 is substantially constituted by the capacitors 7 and 8.

In one practical embodiment, circuit elements of the following types and values were used:

Transistors 1, 9 and 10 of type OC44;
Coil 4=630 μh.;
Coil 6=550 μh. with centre tapping;
Capacitors 7 and 8=230 pfs.;
Choke coils 11 and 12=3 μh.;
Trimmer capacitors 3 and 17 up to 62 pfs.;
Capacitors 15=100 pfs.;
Coupling 4, 6=0.02.

In the embodiment shown in FIG. 2, the signal oscillations produced in the collector-resonant circuit 19–20–21–22 of transistor 1 are supplied via a blocking capacitor 20 and substantially equivalent capacitors 21 and 22 to the emitters of the transistors 9 and 10. Due to the arrangement of the intermediate-frequency choke coils 11 and 12 between the emitters and bases of the transistors 9 and 10, these transistors are again circuited as peak-current rectifiers. The first signal current supplied via the capacitors 21 and 22, respectively, to the transistors 9 and 10, respectively, thus traverses these transistors again with the same phase.

The second signal current supplied to the transistors 9 and 10 is supplied through a blocking capacitor 23 and, on the one hand, through a small capacitor 24 to the emitter of transistor 9 and, on the other hand, through a coil 25 to the emitter of transistor 10. The capacitor 24 and the coil 25 constitute, together with the emitter-base paths of the transistors 9 and 10, a closed series-resonant circuit and the second signal current traversing this series-resonant circuit thus exhibits an average phase shift of 90° with respect to the first signal current and traverses the transistors 9 and 10 in phase opposition. The difference of the demodulated currents is derived from filter circuits 26 and 27 comprising parallel connected resistors and capacitors, the resultant demodulated signal being further amplified in low-frequency stages 28.

In one practical embodiment, the capacitor 20 was about 800 pfs., the capacitors 21 and 22 each 727 pfs., the capacitor 23 about 450 pfs., the capacitor 24 was 25 pfs., and the coil 25 was 236 μh. The choke coils 11 and 12 were each 470 μh., the filter circuits 26 and 27 each being provided with a resistor of 470 ohms and a parallel capacitor of 33,000 μμf.

The illustrated variation in the production of the difference between the demodulated currents by means of the filters 26 and 27, which may also be used in the embodiment of FIG. 1 permits on the one hand a simple push-pull control of the low-frequency stage 28 and, on the other hand, that a common collector resistor 29 of the transistors 9 and 10 may have derived from it a control voltage which may be used for fading control or silent tuning. In fact, the demodulated oscillations of the transistors 9 and 10 substantially neutralize each other at the terminal A of resistor 29, a direct voltage proportional to the amplitude of the carrier wave being produced, which may serve for automatic volume control. When the input signal disappears, an alternating noise voltage is produced at point A, which in the embodiment of FIG. 2 is supplied to stage 30, in which the alternating voltage traverses an amplifier stage 31, a further amplifier stage 32 having threshold value means 33 and integration networks 34 and 35 to control finally a triggering stage 36, resulting in a control voltage across output terminal B, which blocks the first amplifier stage of low-frequency amplifier 28 when the signal is not strong enough.

It will be evident that the circuit-arrangements shown in FIGS. 1 and 2 could also be used for comparison of the phases of two signal oscillations. For this purpose it would be necessary, for example, in FIG. 1, to avoid the relative inductive coupling between the coils 4 and 6 and to supply the second signal oscillation to a winding 40 coupled to the coil 6. In a similar manner, in FIG. 2, the second signal oscillation could be supplied via blocking capacitor 23 to the transistors 9 and 10 and the connection between capacitor 23 and the collector of transistor 1 could be interrupted.

If desired, it is possible to bring about a capacitive coupling instead of the inductive coupling between the circuits 2 and 5 or in addition to this coupling, for example when the capacitors 7 and 8 are given different values. Also, the capacitor 15 may be connected to a tapping on coil 6 which is displaced with respect to its centre. However, this results in the linearity of the demodulation curve being detrimentally affected. Furthermore, instead of using the single capacitor 15 it would be possible to connect the circuit 2 via a capacitor to each extremity of the coil 6, but this involves the use of a larger number of circuit elements.

What is claimed is:

1. A discriminator network circuit arrangement for detecting wavelength variations of a first signal relative to a given frequency value, comprising inductance and capacitance elements connected in series relationship, said elements having values producing a circuit series resonant at said given frequency, two transistors each having emitter, base and collector electrodes defining an emitter-base path and a collector-base path, means for connecting the emitter-base paths of said transistors in said series circuit in phase opposition, means for applying said first signal in the same phase to the emitter-base paths of said first and second transistors, means for producing a second signal at said given frequency, means for applying said second signal in phase opposition to the said emitter-base paths of said transistors thereby to produce current flow through said emitter-base paths substantially equal to the vector sum of the first and second signals, and means for deriving from the base-collector paths of said transistors an output signal having variations as determined by the wavelength variations of said first signal relative to said second signal.

2. A discriminator network as claimed in claim 1, wherein said means for producing said second signal current comprises an inductance-capacitance circuit parallel resonant at said given frequency, said last-mentioned inductance being inductively coupled to the inductance element of said series resonant circuit.

3. A discriminator network as claimed in claim 1, wherein the said inductance of the series resonant circuit comprises a center tapping, and wherein a point of said parallel resonant inductance at high signal potential is connected to said center tapping.

4. A discriminator network as claimed in claim 1, further comprising high impedance inductor elements shunting the said emitter-base paths of said transistors.

5. A discriminator network as claimed in claim 1, further comprising a voltage limiting element shunting said means for producing said first signal.

6. A discriminator network circuit arrangement for detecting wavelength variations of an input signal relative to a given frequency value, comprising an inductance element and a capacitance element connected in series relationship, said elements having values producing a circuit series resonant at said given frequency, two transistors each having emitter, base and collector electrodes defining an emitter-base path and a collector-base path, means for connecting the emitter and base electrodes of said transistors in said series circuit in phase opposition, capacitance means for applying said input signal as a first component to the external ends of said series resonant circuit, capacitance means for applying said input signal as a second component to the junction of said inductance and capacitance elements, impedance means in each of said base-collector paths, and output circuit means connected to said impedance means.

7. A discriminator network circuit arrangement as claimed in claim 6, wherein said impedance means are connected between said bases and a common point of reference potential, further comprising an impedance element, means for connecting said collectors in common through said last-mentioned impedance to a source of energizing potential, and means for deriving from said last-mentioned impedance a potential having a value determined by the intensity of said input signal.

8. A circuit for detecting the phase difference between first and second signals of the same frequency, comprising a series circuit of inductance means and capacitance means, said series circuit being series resonant at said frequency, first and second transistors each having base, emitter and collector electrodes defining an emitter-base path and a collector-base path, first and second inductor elements each having a high impedance at said frequency, said first and second inductor elements being connected in shunt with the emitter-base paths of said first and second transistors respectively, means connecting the emitter-base paths of said first and second transistors in series with said series circuit in phase opposition, means applying said second signal to said series circuit, means applying said first signal in the same phase to the emitter-base paths of said first and second transistors, whereby current flow through said emitter-base paths is substantially equal to the vector sum of said first and second signals, and means for deriving from the collector-base paths of said transistors an output signal dependent upon the relative phase difference of said first and second signals.

References Cited in the file of this patent

UNITED STATES PATENTS

| | | |
|---|---|---|
| 2,634,369 | Swanson | Apr. 7, 1953 |
| 2,817,756 | Debel | Dec. 24, 1957 |
| 2,857,517 | Jorgensen et al. | Oct. 21, 1958 |
| 2,870,413 | Cluwen | Jan. 20, 1959 |